United States Patent
Goossens et al.

(10) Patent No.: US 9,013,278 B2
(45) Date of Patent: Apr. 21, 2015

(54) SYSTEM AND METHOD FOR RESPONDING TO A REQUEST RECEIVED AT AN OBJECT WITH AN RFID DEVICE

(75) Inventors: Kees Gerard Willem Goossens, Eindhoven (NL); Lukasz Szostek, Eindhoven (NL)

(73) Assignee: NXP, B.V., Eindhoven (NL)

(*) Notice: Subject to any disclaimer, the term of this patent is extended or adjusted under 35 U.S.C. 154(b) by 590 days.

(21) Appl. No.: 12/856,884

(22) Filed: Aug. 16, 2010

(65) Prior Publication Data

US 2012/0038465 A1  Feb. 16, 2012

(51) Int. Cl.
*H04Q 5/22* (2006.01)
*G06Q 10/08* (2012.01)
*G06K 19/07* (2006.01)
*G06K 17/00* (2006.01)

(52) U.S. Cl.
CPC .......... *G06Q 10/087* (2013.01); *G06K 19/0727* (2013.01); *G06K 17/0022* (2013.01)

(58) Field of Classification Search
CPC ... G06Q 20/40; G06Q 20/32; G06Q 20/3674; H04W 12/08; H04W 12/06; H04W 8/245; H04W 88/02; H04W 4/12; H04W 12/10; H04W 12/12; H04L 67/306; H04L 12/5895; H04L 67/04
USPC ............. 340/571, 572.1, 572.2, 572.3, 572.8, 340/572.9, 10.1–10.6; 455/1, 68, 26.1, 455/456.4, 410, 411, 418, 419, 420, 558
See application file for complete search history.

(56) References Cited

U.S. PATENT DOCUMENTS

| | | | |
|---|---|---|---|
| 6,112,152 A | 8/2000 | Tuttle | |
| 7,286,057 B2 | 10/2007 | Bolling | |
| 7,522,056 B2 * | 4/2009 | Roque | 340/572.7 |
| 2005/0030384 A1 * | 2/2005 | Lee et al. | 348/207.99 |
| 2007/0008149 A1 * | 1/2007 | Bolling | 340/573.1 |
| 2007/0032225 A1 * | 2/2007 | Konicek et al. | 455/417 |
| 2007/0106765 A1 | 5/2007 | Erickson et al. | |
| 2007/0270167 A1 * | 11/2007 | Mardiks et al. | 455/456.4 |
| 2008/0030588 A1 * | 2/2008 | Boss et al. | 348/211.2 |
| 2008/0160984 A1 * | 7/2008 | Benes et al. | 455/419 |
| 2008/0204199 A1 | 8/2008 | Howarth et al. | |
| 2009/0040022 A1 * | 2/2009 | Finkenzeller | 340/10.1 |
| 2009/0117919 A1 * | 5/2009 | Hershenson | 455/456.4 |

(Continued)

FOREIGN PATENT DOCUMENTS

| | | |
|---|---|---|
| CN | 101256634 A | 9/2008 |
| CN | 101299253 A | 11/2008 |

(Continued)

OTHER PUBLICATIONS

Extended European Search Report for Patent Appln. No. 11177727.2 (Dec. 1, 2014).

*Primary Examiner* — George Bugg
*Assistant Examiner* — Sharmin Akhter (57) ABSTRACT

A method and system for responding to a request received at an object with a radio frequency identification (RFID) device is described. In one embodiment, a method for responding to a request received at an object with an RFID device is described. The method for responding to a request received at an object with an RFID device involves receiving a request at an RFID device, providing the request from the RFID device to a component of the object, and processing the request at the component of the object. Other embodiments are also described.

19 Claims, 4 Drawing Sheets

(56) References Cited

U.S. PATENT DOCUMENTS

2011/0070866 A1* 3/2011 Chien .......................... 455/411
2011/0165861 A1* 7/2011 Wilson et al. ................. 455/411

FOREIGN PATENT DOCUMENTS

| CN | 101496072 A | 7/2009 |
|---|---|---|
| EP | 0 827 100 A2 | 3/1998 |

* cited by examiner

SYSTEM AND METHOD FOR RESPONDING TO A REQUEST RECEIVED AT AN OBJECT WITH AN RFID DEVICE

Embodiments of the invention relate generally to electronic systems and methods and, more particularly, to communications systems and methods for responding to a request.

A radio frequency identification (RFID) device such as an RFID tag can be embedded in an object such as an item for sale or a book to prevent an unauthorized removal of the product from a retail store or a library. An RFID device can also be used to store certain information related to the object in which the RFID device is embedded. However, the information that is stored in the RFID device is typically limited. Additionally, although the RFID device is physically connected to the object, the RFID device and the object usually do not share information. When a request to the object wants to access information that is not stored in the RFID, the request cannot be properly processed by the RFID device alone.

A method and system for responding to a request received at an object with a radio frequency identification (RFID) device involves receiving a request at an RFID device, providing the request from the RFID device to a component of the object, and processing the request at the component of the object.

In an embodiment, a method for responding to a request received at an object with an RFID device includes receiving a request at an RFID device, providing the request from the RFID device to a component of the object, and processing the request at the component of the object.

In another embodiment, a communications apparatus includes an object and an RFID device embedded in the object. The object includes a component configured to process a request. The RFID device is configured to receive the request and to provide the request to the component of the object.

In another embodiment, a method for responding to a request received at an object with an RFID device includes receiving a request as an incoming RF signal at the RFID device, where the RFID device is embedded in an object, and where the request includes an inquiry concerning the presence of the object and a characteristic of the object, providing the request from the RFID device to a component of the object, generating a response to the request at the component of the object, where the response includes information about the presence of the object and information about the characteristic of the object, providing the response from the component of the object to the RFID device, and transmitting the response as an outgoing RF signal from the RFID device.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
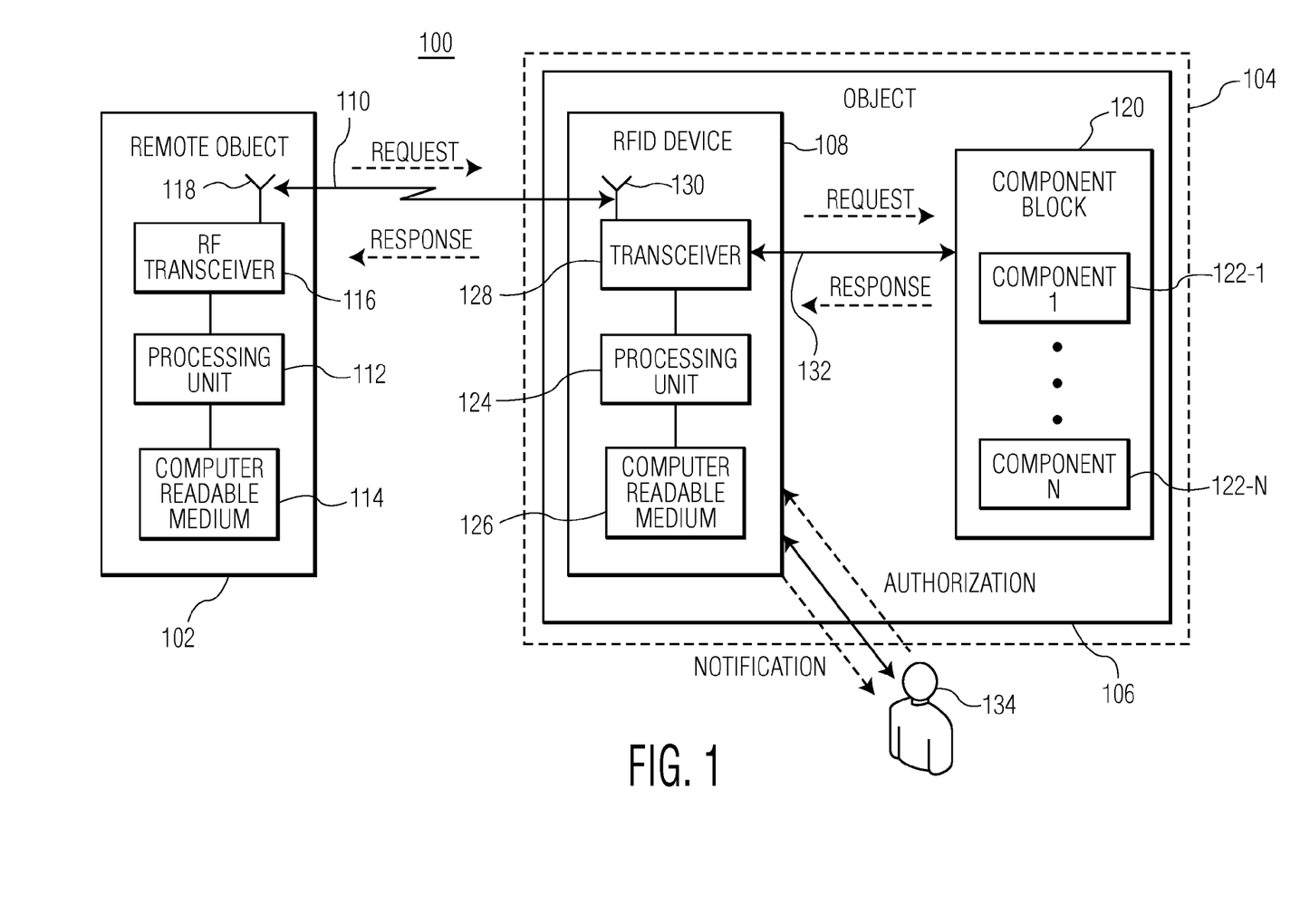
FIG. 1 is a schematic block diagram of an RF communications system in accordance with an embodiment of the invention.

FIG. 1 is a schematic block diagram of an RF communications system 100 in accordance with an embodiment of the invention. In the embodiment depicted in FIG. 1, the RF communications system includes a remote object 102 and a communications apparatus 104. The communications apparatus includes an object 106 and an RFID device 108. Although the RF communications system is depicted and described with certain components and functionality, other embodiments of the RF communications system may include fewer or more components to implement less or more functionality.

The remote object 102 of the RF communications system 100 is configured to communicate with the RFID device 108 through an RF communications channel 110. In the embodiment depicted in FIG. 1, the remote object sends at least one request as one or more RF signals to the RFID device and receives at least one response from the RFID device as one or more RF signals. The remote object may be or may not be permanently physically separate from the RFID device. For example, there may be a removable physical connection between the remote object and the RFID device. In another example, the remote object wirelessly communicates with the RFID device. In the embodiment depicted in FIG. 1, the remote object is physically separate from the object and from the RFID device. For example, the remote object is neither physically connected to the object nor physically connected to the RFID device. In an embodiment, there is no wired connection between the remote object and the object or between the remote object and the RFID device. The remote object may be an embedded device with one or more embedded processors, a Central Processing Unit (CPU) with a VLIW (Very long instruction word) architecture, or a digital signal processor (DSP).

In the embodiment depicted in FIG. 1, the remote object 102 includes a processing unit 112, a computer readable medium 114, an RF transceiver 116, and an antenna 118. The processing unit of the remote object may be a processor such as a multifunction processor or an application-specific processor. Examples of processors include the PowerPC™ family of processors by IBM and the x86 family of processors by Intel, and the DSP processors of TI or Analog devices, etc. The computer readable medium can be any type of a storage device. The computer readable medium may include, for example, storage medium such as read only memory (ROM), flash memory, random access memory (RAM), and/or a large capacity permanent storage device such as a hard disk drive. The RF transceiver and the antenna transmit and receive RF signals wirelessly.

The object 106 of the communications apparatus 104 is configured to process a request that is sent from the remote object 102. In an embodiment, the object is further configured to generate at least one response to a request that is sent from the remote object 102. The object can be any type of a device. In an embodiment, the object is an electronic device. Examples of the electronic device includes, but not limited to, a personal digital assistant (PDA), a MPEG-1 Audio Layer 3 (MP3) player, a Digital Video Disc (DVD) player, a calculator, a Global Positioning System (GPS), a mobile phone, a walky-talky, a digital/analog audio or video camera, a Universal Serial Bus (USB) stick, a key (e.g. electronic car key), a hard disk, a laptop, a netbook, a tablet or iPad-like device, a hearing aid, an implantable device such as a pace maker, a headset/microphone/speaker, a (removable) battery pack, a battery or electronic device charger, a game console (e.g. Nintendo), a remote controller (game console controller, joystick wiimote, etc.), electronic glasses (e.g. for 3D viewing), electronic toys (dolls, robots, guns, wired or wirelessly controlled cars, helicopters, planes, boats), health or sports monitors (e.g. heart rate monitor, ECG monitor, cycling pedaling frequency monitor, cycling power/torque meter).

In the embodiment depicted in FIG. 1, the object 106 includes a component block 120 that includes N components 122-1 ... 122-N, where N is an integer that is greater than one. Although the object is depicted and described with multiple components, other embodiments of the object may include only one component. At least one of the N components is configured to generate at least one response to at least one request that is sent from the remote object 102. In an embodiment, each of the N components is a separate circuit that is configured to perform a unique or a possible unique function. For example, one component is a camera circuit and another component is a Bluetooth transceiver circuit. In an alternative embodiment, each of the N components is a logical/functional unit. For example, one component is a video recording functional unit and another component is an audio recording functional unit that both may be executed in software on a shared hardware component, such as an embedded processor subsystem.

The request that is sent from the remote object 102 may include an inquiry concerning a single subject of the object 106. In this case, at least one of the N components 122-1 ... 122-N is configured to include information about the single subject of the object in the response. In an embodiment, the single subject of the object is the presence of the object. In another embodiment, the single subject of the object is a characteristic of the object. The characteristic of the object may be an identity of the object, a functionality of the object, or a status of a functionality of the object. In an embodiment, each of the N components is configured to perform a different functionality. The functionality of the object can be a functionality of one of the N components of the object. Examples of the characteristic of the object include, but are not limited to, internet/Bluetooth/Global System for Mobile communication (GSM) capability, sensing capability such as location/temperature/humidity/wireless sensing capability, monitoring sensing capability such as listening/seeing/recording capability, playing back capability, transmission capability, storage capability, capability of causing interference problems such as wireless transmission capability, ability to record legally and/or illegally, and ability to produce a sound or light, status such as on/off, active/inactive/standby, paid/free, locked/unlocked, registered/unregistered, legal/illegal/cracked/hacked, and status such the location, temperature, humidity, color, battery charge, memory or processing load or availability of the object, or the object's presence/closeness to other objects, whether the object is connected to a wired or wireless network or not, whether or not the object is connected to a power source.

As an alternative to sending an inquiry concerning a single subject of the object 106, the request that is sent from the remote object 102 may include an inquiry concerning multiple subjects of the object. In this case, at least one of the N components 122-1 ... 122-N is configured to include information about the multiple subjects of the object in the response. In an embodiment, the multiple subjects of the object are a combination of the presence of the object and one or more characteristics of the object. In an example, the multiple subjects of the object include the presence of the object and a characteristic of the object such as an identity of the object, a functionality of the object, or a status of a functionality of the object. In another example, the multiple subjects of the object include multiple characteristics of the object.

In an embodiment, the request that is sent from the remote object 102 includes an inquiry concerning multiple levels of subjects of the object 106. In this case, at least one of the N components 122-1 ... 122-N is configured to include information about the multiple levels of subjects of the object in the response. The multiple levels of subjects of the object may include the presence of the object, a functionality of the object, and a status of the functionality of the object.

In an embodiment, the request that is sent from the remote object 102 includes an inquiry concerning three levels of subjects of the object 106. The first level is whether or not the object is present. An example of the first level is whether or not a targeted person carries a mobile phone, a video or audio camera, a battery pack, or a memory stick. The second level is whether the object has certain function/functionalities, property/properties, or capacity/capabilities. Examples of the second level include whether or not the object has a WIFI, a Bluetooth, or an Infrared (IR) interface, whether or not the object can take photos, record video, audio, whether or not the object has a particular application installed, what applications are installed in the object, and what the version of a particular capability of the object is. The third level is what the status of the relevant function/functionalities, property/properties, or capacity/capabilities is. Examples of the third level include whether or not a mobile phone is in airplane mode, whether or not the ringer switch of the mobile phone is on, whether or not the mobile phone is in a vibration mode, whether or not the mobile phone is off, and whether or not the mobile phone is connected to a battery.

In an embodiment, the request that is sent from the remote object 102 includes an instruction for changing at least one functionality of at least one of the N components 122-1 . . . 122-N of the object 106. In this case, the RFID device 108 provides the instruction to the object and the object changes the functionality of the particular component according to the instruction. The object may include information that indicates how the functionality of the particular component of the object is changed in the response to the request.

The RFID device 108 of the communications apparatus 104 is configured to receive at least one request such as one or more incoming RF signals from the remote object 102, to provide the request to at least one of the N components 122-1 . . . 122-N of the object 106. The RFID device may be further configured to receive at least one response from one or more components, and to transmit the response such as an outgoing RF signal. The RFID device communicates with the object wirelessly and/or through a wired link. The object may be or may not be permanently physically separate from the RFID device. The RFID device may be located completely outside of the object. Alternatively, the RFID device may be located partially inside the object. In the embodiment depicted in FIG. 1, the RFID device is embedded in or attached to the object.

In an embodiment, the RFID device 108 is a near field communications (NFC) device. The RFID device may be an active RFID device, which includes an internal power supply such as a battery, or rely on power supplied by the object, or be or a passive RFID device, which has no internal power supply and relies on power emitted by the remote object 102. The RFID device may be an RFID tag, an RFID label, or any type of an RFID integrated circuit (IC).

In the embodiment depicted in FIG. 1, the RFID device 108 includes a processing unit 124, a computer readable medium 126, a transceiver 128, and an antenna 130. The processing unit of the RFID device may be a custom IC, an application-specific IC such as a SmartMX controller by NXP Semiconductors, or a processor such as a multifunction processor or an application-specific processor. Examples of processors include the PowerPC™ family of processors by IBM and the x86 family of processors by Intel, and the DSP processors of TI or Analog devices, etc. The transceiver may be an RF transceiver. The processing unit, the transceiver, and the antenna are configured to receive at least one request as one or more incoming RF signals from the remote object 102 using the antenna, to provide the request to at least one of the N components 122-1 . . . 122-N of the object, to receive at least one response from the N components, and to transmit the response as an outgoing RF signal using the antenna. The computer readable medium is configured to store the request that is received from the remote object and the response that is received from the components of the object. The computer readable medium can be any type of a storage device. The computer readable medium may include, for example, storage medium such as read only memory (ROM), flash memory, Erasable Programmable Read Only Memory (EPROM), and/or random access memory (RAM). In some embodiments, the RFID device does not include a computer readable medium. In an embodiment, the RFID device does not include the processing unit and one or more components of the object fulfill the role and functionality of the processing unit. In this case, the RFID device acts simply as a link-level relay between the object and the remote object.

The RFID device 108 and the component block 120 of the object 106 may be physically connected through a wired link. In the embodiment depicted in FIG. 1, the RFID device and the component block are connected by a wired link 132. The wired link facilitates the communications between the RFID device and the N components 122-1 . . . 122-N of the component block. The wired link may be a bus cable, an optical wire, or an electrical wire. In some embodiments, the RFID device and the component block of the object communicate wirelessly without using an electrical link.

Compared with responding to a request at the object 106 using only information stored in the RFID device 108 without providing the request to a component 122-1 . . . 122-N of the object, providing the request from the RFID device to a component of the object and transmitting a response that is generated by the component of the object using the RFID device allows for a more advanced request processing. Because the RFID device can query the object in which the RFID device is embedded, and return information about the status of the object in which the RFID device is embedded, the response to the request is not restricted to the information that is stored in the RFID device. For example, an RFID module embedded in an electronic device such as a mobile phone, a camera, a recording device, a playback device or a memory/storage device can return not only information related to the identity of the electronic device but also information related to the electronic device's capabilities such as static, semi-static, or dynamic capabilities, and the electronic device's status such as present or absent, active or inactive, on or off, passive or active, listening, transmitting, recording, in vibration mode or not, camera-enabled, software/firmware version. Additionally, because the RFID device can provide the request to the object in which the RFID device is embedded, a third party such as the remote device 102 can control the changing of a functionality of the object.

In an embodiment, the request that is sent from the remote object 102 is invisible (or unknown) to a user or the owner 134 of the object 106. By keeping the request that is sent from the remote object invisible to the user of the object, the responding process does not interfere with the object's normal operation and cannot be disabled by the user of the object, which is advantageous for security applications.

In an alternative embodiment, the request that is sent from the remote object 102 is visible (or known or made known) to the user or the owner 134 of the object 106. For example, the RFID device 108 sends a notification of the request to the user of the object. By keeping the request that is sent from the remote object visible to the user of the object, the user of the object can have better control over whether or not a third party can read out information from the object. For example, the RFID device that is embedded in an electronic device may always return information on the presence of the electronic device, but not on further capabilities and/or the status of the electronic device, for example, the available features and the on/off state of the electronic device. Any additional information besides the presence of the electronic device may be given out to authorized third parties only.

After the user 134 of the object receives the notification of the request from the RFID device 108, the user of the object 106 can instruct the RFID device to deal with the request. In an embodiment, the user of the object sends an authorization signal or message that authorizes the request to the RFID device. Authorization by the user can occur during the request (for example, by means of a pop-up software window or prompt) or in advance of the request. For example, an authorization in advance of the request can take place through a software preference panel or a physical switch in the object. Authorizations can be for all time, for a limited time, for all or some remote objects or object types, for all or some requests, for a specified (maximum) number of requests, for all or some components of the object, for all or some functions of the object, or any combination of these. Authorization by the user may be determined based on electronic certificates that are received from the remote object 102. In an embodiment, the RFID device receives the authorization signal or message that authorizes the request from the user of the object and then provides the request to the component 122-1 . . . 122-N of the object. In another embodiment, the user of the object sends a rejection signal or message that rejects the request to the RFID device. In this case, the RFID device does not provide the request that is received from the remote object to the components 122-1 . . . 122-N of the object. The RFID device may send an RF signal to notify the remote object of the rejection. Authorization by the user can be independent from notification to the user. For example, authorization by the user may take place before notification to the user. In an example, notification to the user is disabled by a priori authorization.

In an embodiment, in addition to the request, the RFID device 108 receives identification information related to the request from the remote object 102. In this case, the processing unit 124 of the RFID device may verify the received identification information of the request using verification information that is stored in the computer readable medium 126. The computer readable medium may be at least one physical unclonable function (PUF). In some embodiments, the computer readable medium that stores verification information is not located in the RFID device. For example, the computer readable medium that stores verification information may be located in the object. Alternatively, the RFID device may transmit the received identification information to the user 134 of the object 106 or to the component block 120 of the object for verification.

Figure 2:
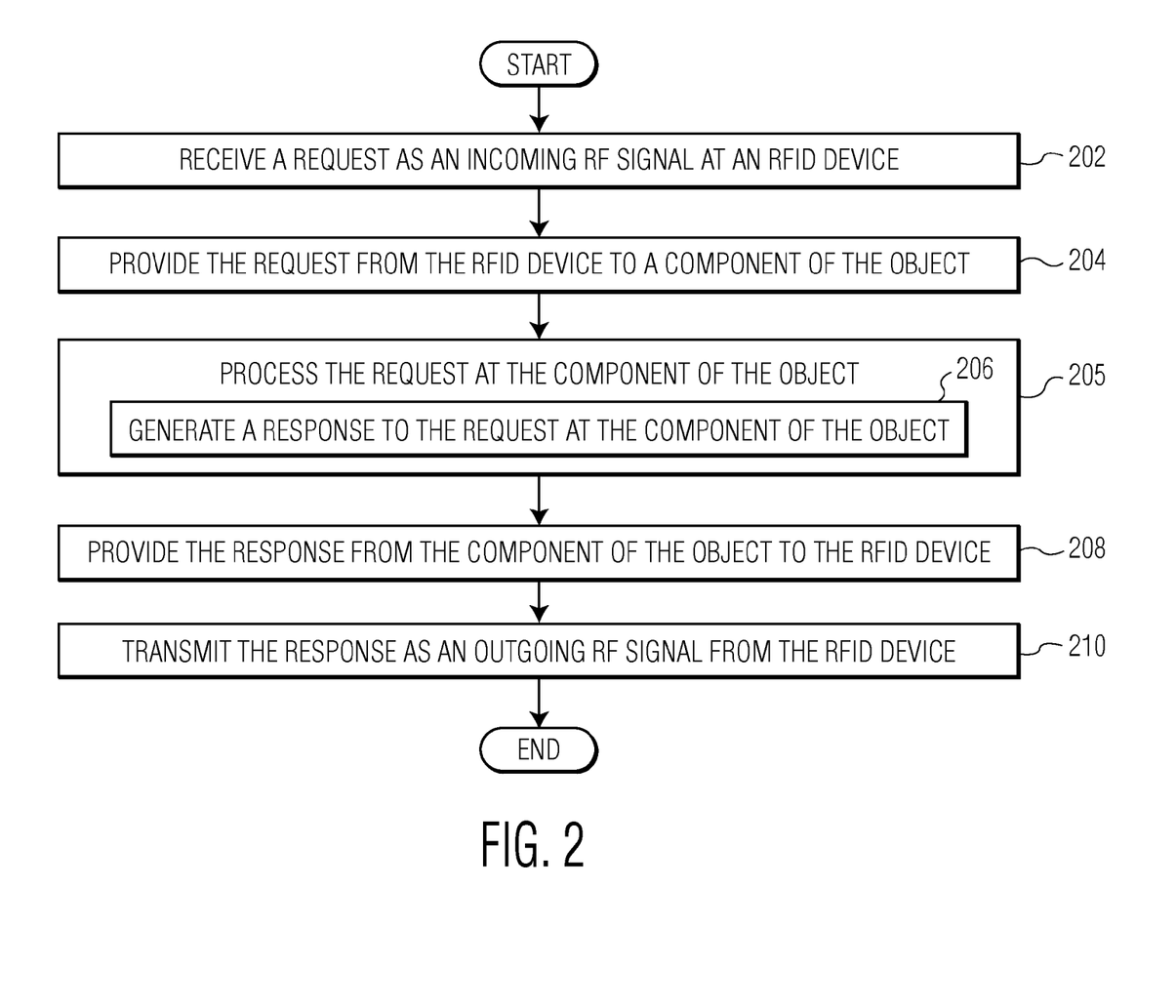
FIG. 2 is a process flow diagram of a first example of an operation of the communications apparatus depicted in FIG. 1.

FIG. 2 is a process flow diagram of a first example of an operation of the communications apparatus 104 depicted in FIG. 1. At block 202, a request is received as an incoming RF signal at the RFID device 108 that is embedded in the object 106. At block 204, the request is provided from the RFID device to a component 122-1 . . . 122-N of the object. At block 205, the request is processed at the component of the object. The component of the object may not generate a response to the request. In the first example of the operation shown in FIG. 2, the component of the object generates a response to the request. At block 206, a response to the request is generated at the component of the object. At block 208, the response is provided from the component of the object to the RFID device. At block 210, the response is transmitted as an outgoing RF signal from the RFID device.

Figure 3:
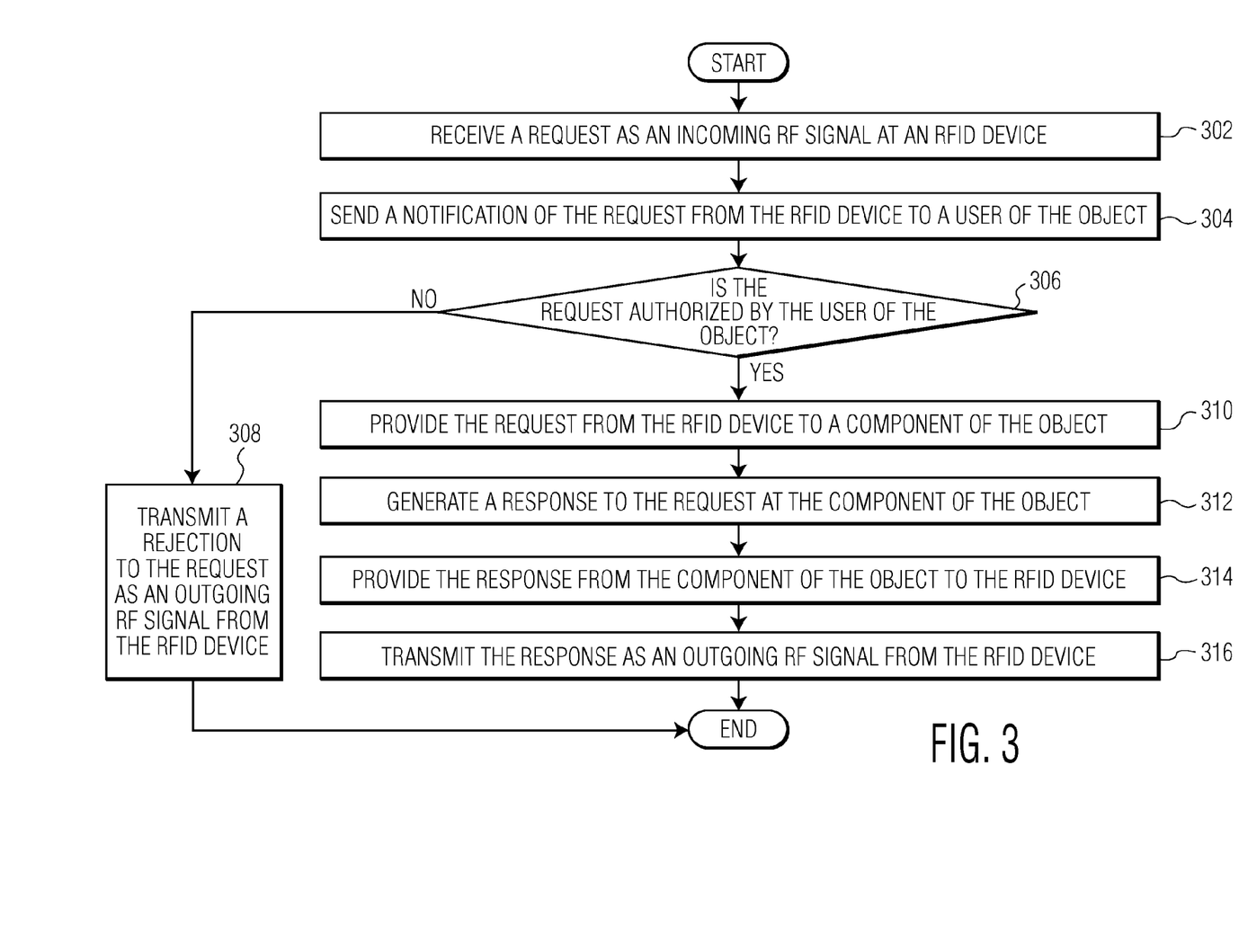
FIG. 3 is a process flow diagram of a second example of an operation of the communications apparatus depicted in FIG. 1.

FIG. 3 is a process flow diagram of a second example of an operation of the communications apparatus 104 depicted in FIG. 1. At block 302, a request is received as an incoming RF signal at the RFID device 108 that is embedded in the object 106. At block 304, a notification of the request is sent from the RFID device to a user 134 of the object. At block 306, whether or not the request is authorized by the user of the object is determined. At block 308, if the request is determined as not being authorized by the user of the object, a rejection to the request is transmitted as an outgoing RF signal from the RFID device. At block 310, block 312, block 314, and block 316 respectively, if the request is determined as being authorized by the user of the object, the request is provided from the RFID device to a component 122-1 . . . 122-N of the object, a response to the request is generated at the component of the object, the response is provided from the component of the object to the RFID device, and the response is transmitted as an outgoing RF signal from the RFID device. At least one of the steps depicted in blocks 308, 312, 314, and 316 may be optional.

Figure 4:
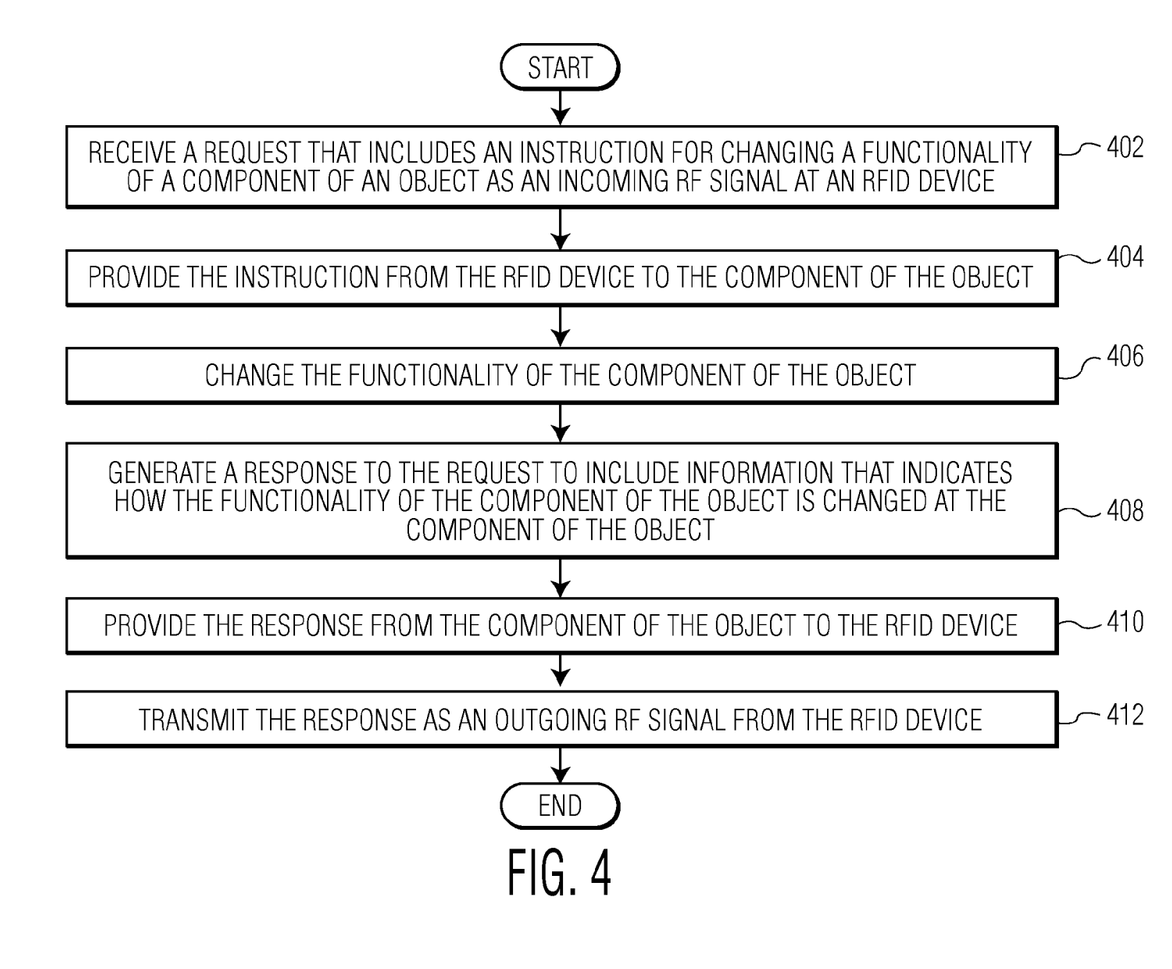
FIG. 4 is a process flow diagram of a third example of an operation of the communications apparatus depicted in FIG. 1.

FIG. 4 is a process flow diagram of a third example of an operation of the communications apparatus 104 depicted in FIG. 1. At block 402, a request is received as an incoming RF signal at the RFID device 108 that is embedded in the object 106. At block 404, the request is provided from the RFID device to a component 122-1 . . . 122-N of the object. At block 406, the functionality of the component of the object is changed. At block 408, a response to the request is generated to include information that indicates how the functionality of the component of the object is changed at the component of the object. At block 410, the response is provided from the component of the object to the RFID device. At block 412, the response is transmitted as an outgoing RF signal from the RFID device. The steps depicted in blocks 408, 410, 412 may be optional.

One or more steps described in one of the three examples may be included in another one of the three examples or be used in any other embodiment of the invention. For example, the step depicted in block 304 may be included in the third example of the operation depicted in FIG. 4 between the step depicted in block 402 and the step depicted in block 406. A notification of a request that includes an instruction for changing the functionality of a component 122-1 . . . 122-N of an object 106 is sent from an RFID device 108 to a user 134 of the object before the RFID device provides the request to the component of the object and/or before the component of the object changes the functionality. As a result, the user of the object can be alerted to a request for a change of the functionality of a component of the object by a third party. Additionally, the step depicted in block 304 and the step depicted in block 306 may be included in the third example of the operation depicted in FIG. 4 between the step depicted by block 402 and the step depicted by block 404. A notification of a request that includes an instruction for changing the functionality of a component of an object is sent from an RFID device to a user of the object and a confirmation or an authorization of the request that is made by the user of the object is received at the RFID device before the RFID device provides the request to the component of the object. As a result, the user of the object can be alerted to a request for a change of the functionality of a component of the object by a third party and can have full control over which third party can change the functionality of a component of the object.

Embodiments of the invention can be used for various environments and applications. For example, embodiments of the invention can be used in airplanes, at secured sites, at concert halls, at examination centers, and in interrogation rooms and in situations where sensitive information is present and in which an electronic device or a certain capability/property/functionality of the electronic device should not be present. By querying an electronic device through an RFID device that is embedded in the electronic device, an airline carrier knows whether or not functions such as mobile and WIFI are present as passengers board a plane. Similarly, patrons can be alerted to switch off mobile phones or pagers upon entering a quiet place such as a concert hall, a train, a library, or a hospital and can be reminded to re-enable the mobile phones or pagers upon leaving. Additionally, for secured sites such as research facilities, military bases, financial institutions, and data centers where photography and/or video recording is forbidden, whether or not a visitor carries an electronic device with photography and/or video recording functionality can be determining while visitors enter the secured sites. Similarly, storage devices such as a USB memory stick, a portable hard disc, or a Secure Digital (SD) card can be detected while visitors enter controlled locations. Furthermore, in places such as examination centers, interview offices, and interrogation rooms where no electronic aids are allowed, the presence of such a device or unauthorized functions can be detected.

Additionally, embodiments of the invention can be used for a third party to change certain functionality/functionalities of an electronic device. By receiving an instruction to change the functionality/functionalities of an electronic device at an RFID device that is embedded in the electronic device and providing the instruction from the RFID device to a component of the electronic device, the functionality/functionalities of the electronic device can be changed. For example, an airline carrier can disable certain functionality of a mobile phone function and the WIFI functionality of electronic devices as passengers board an air plane and re-enable these functions when the passengers leave the air plane. Similarly, mobile phones or pagers of patrons can be switched off as the patrons enter a quiet place such as a concert hall, a train, a library, or a hospital and can be re-enabled as the patrons leave the quiet place. Additionally, for secured sites such as research facilities, military bases, financial institutions, and data centers where photography and/or video recording and wireless communication is forbidden, photography and/or video recording functionality and wireless communications functionality of electronic devices of visitors can be switched while the visitor enters the secured sites. Similarly, storage devices such as USB memory stick, portable hard disc, and Secure Digital (SD) card can be disabled on while visitors enter controlled locations to ensure that no data can be copied to/from the storage devices from/to other electronics devices that are present in the controlled locations. Additionally, audio and/or video recording functionality of electronic devices can be disabled during concerts or other closed events. Functions in a car such as locking/unlocking doors, switching on/off of radio, navigation, alarms, and lights can be controlled at entrances and exits of a restricted location such as a car park, a secure site, and a work site on roads. Furthermore, in places such as examination centers, interview offices, and interrogation rooms where no electronic aids are allowed, the device or unauthorized functions of the device can be disabled.

Embodiments of the invention allow functions of electronic devices to be switched on and off without owner manual actions. As a result, an owner of an electronic device does not have to worry about switching certain functions on and off at certain locations or at certain times. Instead of having to leave an electronic device at an entrance and then traveling back to the entrance to retrieve the electronic device, a visitor having an electronic device can be allowed to take the electronic device into and out of the controlled locations. For example, when a controlled location has multiple exits, a visitor having an electronic device does not have to return to the same entrance to pick up the electronic device. Instead, a visitor can enter the controlled location through one entrance and leave through another entrance while keeping the electronic device on their person.

In some embodiment, certificates that allow a third party to control an object with an RFID device can be dynamically generated. For example, when a person checks in for a flight on an airplane carrier, she/he must authorize her/his electronic equipment such as a mobile phone to be switched off by the airline carrier for certain durations of the travel/flight. Otherwise, he/she cannot check in. The check-in process generates an authorization certificate, which is then transferred to the electronic equipment of the passenger. As long as the authorization certificate is valid in the electronic equipment of the passenger, the airplane carrier is authorized to switch off the phone functionality of the electronic equipment at the departure gate and to re-enable the phone functionality of the electronic equipment after arrival. Upon arrival at the destination of the travel/flight, the authorization certificate expires.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for responding to a request received at a mobile communications device with a radio frequency identification (RFID) device, the method comprising:
receiving a request for turning off or turning on a functionality of the mobile communications device at an RFID device, wherein receiving the request for turning off or turning on the functionality of the mobile communications device comprises receiving the request for switching off the mobile communications device for a duration;
displaying a notification to a user of the mobile communications device for an authorization that authorizes the request for turning off or turning on the functionality of the mobile communications device;
receiving the authorization from the user of the mobile communications device prior to providing the request from the RFID device to the component of the mobile communications device;
receiving an authorization certificate at the mobile communication device that is generated during a check-in process for allowing the user of the mobile communications device into a facility for the duration, wherein the authorization certificate authorizes the request for switching off the mobile communications device for the duration, wherein the authorization certificate expires after the duration;
providing the request from the RFID device to a component of the mobile communications device over a wired link;
processing the request at the component of the mobile communications device; and
wherein the request further contains request information regarding the battery charge status of the mobile communications device and information regarding whether or not the mobile communications device is connected to a power source; wherein the authentication certificate is generated based on a response to the request.

2. The method of claim 1, wherein receiving the request at the RFID device comprises receiving the request as an incoming RF signal at the RFID device, wherein processing the request at the component of the mobile communications device comprises generating a response to the request at the component of the mobile communications device, and wherein the method further comprises:
directly providing the response from the component of the mobile communications device to the RFID device over the wired link; and
transmitting the response as an outgoing RF signal from the RFID device.

3. The method of claim 2, wherein the request includes an inquiry concerning the presence of the mobile communications device, and wherein generating the response comprises including information about the presence of the mobile communications device in the response.

4. The method of claim 2, wherein the request includes an inquiry concerning a characteristic of the mobile communications device, and wherein generating the response comprises including information about the characteristic of the mobile communications device in the response.

5. The method of claim 2, wherein the request includes an inquiry concerning an identity of the mobile communications device, and wherein generating the response comprises including information about the identity of the mobile communications device in the response.

6. The method of claim 2, wherein the request includes an inquiry concerning a functionality of the mobile communications device, and wherein generating the response comprises including information about the functionality of the mobile communications device in the response.

7. The method of claim 2, wherein the request includes an inquiry concerning a status of a functionality of the mobile communications device, and wherein generating the response further comprises including information about the status of the functionality of the mobile communications device in the response.

8. The method of claim 1, wherein the request includes an instruction for changing a functionality of the component of the mobile communications device, and wherein processing the request at the component of the mobile communications device comprises changing the functionality of the component of the mobile communications device according to the instruction.

9. The method of claim 2, wherein the request includes an instruction for changing a functionality of the component of the mobile communications device, wherein processing the request at the component of the mobile communications device further comprises changing the functionality of the component of the mobile communications device according to the instruction, and wherein generating the response comprises including information that indicates how the functionality of the component of the mobile communications device is changed in the response.

10. The method of claim 1, wherein the RFID device is embedded in the mobile communications device.

11. A communications apparatus comprising:
a mobile communications device, wherein the mobile communications device comprises a component configured to process a request for turning off or turning on a functionality of the mobile communications device, wherein the request for turning off or turning on the functionality of the mobile communications device comprises a request for switching off the mobile communications device for a duration;
a radio frequency identification (RFID) device, wherein the RFID device is configured to receive the request and to provide the request to the component of the mobile communications device over a wired link, wherein the communications apparatus displays a notification to a user of the mobile communications device for an authorization that authorizes the request for turning off or turning on the functionality of the mobile communications device, wherein the communications apparatus receives an authorization certificate at the mobile communication device that is generated during a check-in process for allowing the user of the mobile communications device into a facility for the duration, wherein the authorization certificate authorizes the request for switching off the mobile communications device for the duration, wherein the authorization certificate expires after the duration, and wherein the RFID device receives the authorization from the user of the mobile communications device prior to providing the request from the RFID device to the component of the mobile communications device; and
wherein the request further contains request information regarding the battery charge status of the mobile communications device and information regarding whether or not the mobile communications device is connected to a power source; wherein the authentication certificate is generated based on a response to the request.

12. The communications apparatus of claim 11, wherein the component is further configured to generate a response to the request, and wherein the RFID device is further configured:
to receive the request as an incoming RF signal,
to directly receive the response from the component over the wired link, and
to transmit the response as an outgoing RF signal.

13. The communication apparatus of claim 11, wherein the RFID device is embedded in the mobile communications device.

14. The communications apparatus of claim 12, wherein the request includes an inquiry concerning the presence of the mobile communications device and a characteristic of the mobile communications device, and wherein the component is further configured to include information about the presence of the mobile communications device and information about the characteristic of the mobile communications device in the response.

15. The communications apparatus of claim 12, wherein the request includes an instruction for changing a functionality of the component, and wherein the component is further configured to change the functionality of the component according to the instruction and to include information that indicates how the functionality of the component is changed in the response.

16. A method for responding to a request received at a mobile communications device with a radio frequency identification (RFID) device, the method comprising:
receiving a request for turning off or turning on a functionality of the mobile communications device as an incoming RF signal at an RFID device, wherein receiving the request for turning off or turning on the functionality of the mobile communications device comprises receiving the request for switching off the mobile communications device for a duration, wherein the RFID device is embedded in a mobile communications device, and wherein the request includes an inquiry concerning the presence of the mobile communications device and a characteristic of the mobile communications device;

displaying a notification to a user of the mobile communications device for an authorization that authorizes the request for turning off or turning on the functionality of the mobile communications device;

receiving the authorization from the user of the mobile communications device prior to providing the request from the RFID device to the component of the mobile communications device;

receiving an authorization certificate at the mobile communication device that is generated during a check-in process for allowing the user of the mobile communications device into a facility for the duration, wherein the authorization certificate authorizes the request for switching off the mobile communications device for the duration, wherein the authorization certificate expires after the duration;

directly providing the request from the RFID device to a component of the mobile communications device over a wired link;

generating a response to the request at the component of the mobile communications device, wherein the response comprises information about the presence of the mobile communications device and information about the characteristic of the mobile communications device;

providing the response from the component of the mobile communications device to the RFID device over the wired link;

transmitting the response as an outgoing RF signal from the RFID device; and wherein the request further contains request information regarding the battery charge status of the mobile communications device and information regarding whether or not the mobile communications device is connected to a power source; wherein the authentication certificate is generated based on a response to the request.

17. The method of claim 1, wherein the notification comprises a pop-up window or prompt.

18. The method of claim 1, wherein the request contains information regarding whether or not the mobile communications device has a WIFI, a Bluetooth, or an Infrared (IR) interface, whether or not the mobile communications device can take photos, record video, audio, whether or not the mobile communications device has a particular application installed, and what applications are installed in the mobile communications device.

19. The method of claim 1, wherein the functionality of the mobile communications device comprises a wireless communications functionality, a temperature or humidity sensing capability, a recording capability, a playing back capability, a storage capability, and an ability to produce a sound or light.

* * * * *